(No Model.)

N. POTTER.
Animal Power.

No. 243,618. Patented June 28, 1881.

WITNESSES:
Francis McArdle
C. Sedgwick

INVENTOR:
N. Potter
BY Munn & Co
ATTORNEYS.

UNITED STATES PATENT OFFICE.

NICHOLAS POTTER, OF TROY, PENNSYLVANIA.

ANIMAL-POWER.

SPECIFICATION forming part of Letters Patent No. 243,618, dated June 28, 1881.

Application filed May 26, 1881. (No model.)

*To all whom it may concern:*

Be it known that I, NICHOLAS POTTER, of Troy, in the county of Bradford and State of Pennsylvania, have invented certain useful Improvements in Animal-Powers, of which the following is a specification.

Figure 1:
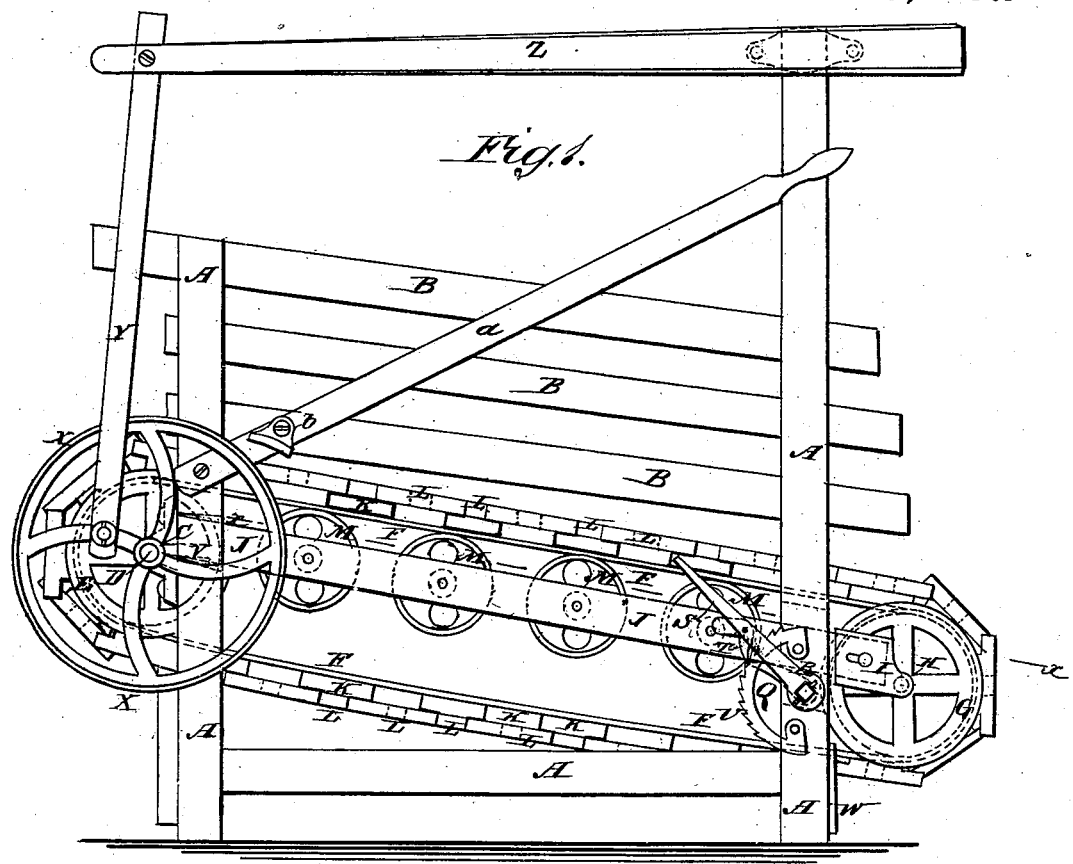
Figure 2:
Figure 3:
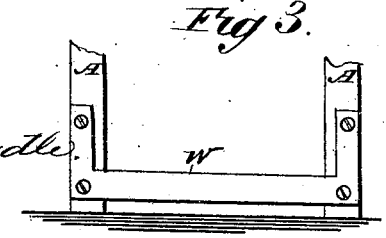

Figure 1 is a side elevation of my improvement. Fig. 2 is a sectional plan view of the same, taken through the line x x, Fig. 1. Fig. 3 is a rear elevation of the lower part of the frame.

Similar letters of reference indicate corresponding parts.

The object of this invention is to improve the construction of the animal-powers for which Letters Patent No. 112,179 were issued to me February 28, 1871, in such a manner as to make them more convenient in use and less expensive in transportation.

The invention consists in the combination, with the forward posts of the main frame made with grooves and the bearings for the forward shaft, of the forward ends of the outer side bars of the track-frame, whereby the track-frame is held from sliding forward, and its rear end is allowed to move up and down freely; also, in the combination, with the main frame, of a separable track-frame, whereby the said track-frame can be applied and removed without interfering with the main frame; also, in constructing the track-frame with grooves in the cross-bars attached to the outer side bars, to receive the ends of the inner side bars, whereby the said inner side bars can be readily applied and detached; and, also, in the combination, with the lower ends of the rear posts of the main frame, of the yoke, whereby the said posts are firmly connected without interfering with the lowering of the rear end of the track-frame, as will be hereinafter fully described.

A is the frame of the machine, and B are the guard-bars to keep the animal in place while at work.

To the forward sides of the front posts of the frame A are attached bearings C, in which revolves the forward shaft, D.

To the shaft D are attached flanged wheels E, around which pass the endless belts F. The endless belts F also pass around flanged wheels G attached to the rear shaft, H, which revolves in bearings I attached to the rear ends of the outer side bars, J, of the track-frame. The bearings I are slotted to receive the bolts that secure the bearings I to the side bars, J, so that the said bearings I can be readily adjusted to regulate the tautness of the track-belts F.

To the endless belts F are attached the track boards or slats K, to each end of each of which is attached a cross-bar, L. The ends of the cross-bars L project so that their said ends will overlap the ends of the adjacent track-slats K, to give firmness and stiffness to the track. The upper part of the track rests upon the faces of rollers M, so as to cause the said upper part of the track to keep in a straight line. The outer journals of the rollers or pulleys M revolve in bearings in the outer side bars, J, of the track-frame, and their inner journals revolve in bearings in the inner side bars, N, of the said track-frame. The ends of the inner side bars, N, rest in grooves O in the end bars, P, the ends of which are made L-shaped, and are bolted to the outer side bars, J, so that the inner side bars, N, and with them the rollers M, can be readily detached by raising the ends of the said inner side bars out of the said grooves O. The rear parts of the outer side bars, J, rest upon cams Q, rigidly attached to the shaft R, which works in bearings in holes in the rear posts of the frame A. One end of the shaft R projects, and to it is rigidly attached the end of a lever, S, so that the shaft R and cams Q can be adjusted to raise and lower the rear end of the track, according as a heavier or lighter animal is to be used, or as more or less power may be required.

To the lever S is pivoted a pawl, T, which engages with the teeth of a curved catch-bar, U, attached to a post of the frame A, so as to hold the rear end of the track securely in any position into which it may be adjusted. The forward ends of the outer side bars, J, are placed in grooves V, in the inner sides of the forward posts of the frame A, and rest against the bearings C, in which the forward shaft, D, revolves. With this construction the track is held from sliding forward by the bearings C, and is held from sliding rearward by the endless belts F, and at the same time the rear end of the track can be raised and lowered freely.

The lower ends of the rear posts of the frame A are held firmly in place by a cross-bar or yoke, W, the ends of which are made L-shaped, and are bolted to the said post. By this construction the yoke W will not interfere with the upward and downward movement of the rear end of the track.

To one end of the forward shaft, D, is attached a crank-wheel, X, which is made large and heavy to serve also as a fly-wheel, and to the crank-pin of which is pivoted the lower end of a connecting-bar, Y. The upper end of the connecting-bar Y is pivoted to the end of a walking-beam, Z, which is pivoted to the upward extension of one of the rear posts of the frame A. With the other end of the beam Z is connected the machinery to be driven; or, if desired, motion can be taken from the forward shaft, D, to the machinery to be driven by a band and pulleys or other suitable gearing.

To a forward post of the frame A, at the inner side of the crank-wheel X, is pivoted the end of a lever, a, which extends back into such a position that it can be conveniently reached and operated by the attendant. To the side of the lever a is attached a brake-shoe, b, in such a position that it can be readily applied by operating the lever a to the crank-wheel X, to stop the motion of the machine, and to hold the track stationary while the animal is passing on and off the said track.

Having thus fully described my invention, I claim as new and desire to secure by Letters Patent—

1. In an animal-power, the combination, with the forward posts of the frame A, made with grooves V, and the bearings C, of the forward ends of the outer side bars, J, of the track-frame, substantially as herein shown and described, whereby the track-frame is held from sliding forward, and its rear end is allowed to move up and down freely, as set forth.

2. In an animal-power, the combination, with the main frame A, of a separable track-frame, J N P, substantially as herein shown and described, whereby the said track-frame can be applied and removed without interfering with the said main frame, as set forth.

3. In an animal-power, the track-frame constructed, substantially as herein shown and described, with grooves O in the cross-bars P, attached to the outer side bars, J, to receive the ends of the inner side bars, N, whereby the said inner side bars can be readily applied and detached, as set forth.

4. In an animal-power, the combination, with the lower ends of the rear posts of the main frame A, of the yoke W, substantially as herein shown and described, whereby the said posts are firmly connected without interfering with the lowering of the rear end of the track-frame, as set forth.

NICHOLAS POTTER.

Witnesses:
  DELOS ROCKWELL,
  W. A. MAYNARD.